United States Patent [19]
Yudkowsky

[11] Patent Number: 5,396,536
[45] Date of Patent: Mar. 7, 1995

[54] AUTOMATIC PROCESSING OF CALLS WITH DIFFERENT COMMUNICATION MODES IN A TELECOMMUNICATIONS SYSTEM

[75] Inventor: Michael A. Yudkowsky, Chicago, Ill.
[73] Assignee: AT&T Corp., Murray Hill, N.J.
[21] Appl. No.: 902,623
[22] Filed: Jun. 23, 1992
[51] Int. Cl.[6] .......................................... H04M 11/00
[52] U.S. Cl. ...................................... 379/52; 379/93; 379/97; 379/98
[58] Field of Search ....................... 379/52, 67, 88, 89, 379/93, 96, 97, 98, 102, 100, 201; 455/102

[56] References Cited

U.S. PATENT DOCUMENTS

| | | | |
|---|---|---|---|
| 4,852,149 | 7/1989 | Zwick et al. | 379/67 |
| 5,056,132 | 10/1991 | Coleman et al. | 379/102 |
| 5,062,133 | 10/1991 | Melrose | 379/201 |
| 5,121,421 | 6/1992 | Alheim | 379/52 |
| 5,146,488 | 9/1992 | Okada et al. | 379/100 |
| 5,253,285 | 10/1993 | Alheim | 379/52 |

FOREIGN PATENT DOCUMENTS

| | | | |
|---|---|---|---|
| 0105441 | 4/1984 | European Pat. Off. | H04Q 3/42 |
| 0245028 | 4/1987 | European Pat. Off. | |
| 0382212 | 8/1990 | European Pat. Off. | |

OTHER PUBLICATIONS

S. D. Hester, et al., "The AT&T Multi-Mode Voice Systems-Full Spectrum Solutions for Speech Processing Applications", *Proceedings of the 1985 AVIOS Conference*, Sep. 1985, pp. 1–10.

IBM Technical Disclosure Bulletin, vol. 34, No. 7B, Dec., 1991, New York, US, pp. 423–426.

*Primary Examiner*—Curtis Kuntz
*Assistant Examiner*—Jason Chan
*Attorney, Agent, or Firm*—Charles L. Warren

[57] ABSTRACT

A multimode service system processes calls routed to it by a digital switch in a telecommunications system wherein choices are selectable by the user. Calls are processed by automatically determining the mode of communication utilized by the calling party and communicating with the calling party utilizing the calling party's communication mode to obtain information needed to route the call or implement user selectable features. A reply from the user provides information which determines feature selection or a call routing path. The multimode service system transmits a signal to the telecommunications system which defines the feature or path selection based on the reply from the user.

20 Claims, 6 Drawing Sheets

AUTOMATIC PROCESSING OF CALLS WITH DIFFERENT COMMUNICATION MODES IN A TELECOMMUNICATIONS SYSTEM

BACKGROUND OF THE INVENTION

This invention is generally directed to information handling in a telecommunications system in which different non-predetermined modes of communication can be utilized by the originating user for a communication channel. More specifically, this invention is directed to automatic adoption of the user's communication mode for sending call routing and feature selection messages to the user.

In a telecommunications system, such as the public switched telephone network (PSTN) in the United States, the most common communication mode consists of a conventional voice call between two users. It is apparent that for a conventional voice telephone call, the parties must have the capability to speak and hear. The PSTN also supports other communication modes employing various forms of amplitude and phase modulation. Telecommunications systems accept user input via dual tone multiple frequency (DTMF) tones following initial call completion to permit the user to make selections in response to a voiced menu of choices such as in incoming call routing used by a company to direct calls by subject matter.

A telecommunications device for the deaf (TDD) is available to provide communications with the hearing impaired. This device includes a keyboard and a screen display which permits the hearing impaired to communicate over conventional telephone lines by transmitting and receiving alphanumeric characters via digital communications using a Baudot code which is well known. A party communicating with a person using a TDD must either use a TDD or utilize an operator having a TDD as a translator between the TDD communication mode and conventional voice communications. For a heating impaired person using a TDD to place a call to a party who is not hearing impaired and does not have a TDD, the hearing impaired originates a call to an operator with TDD capability at a predetermined number. The originator communicates the number to be dialed by the TDD to the operator who places a conventional call to the other party. The operator translates the text received on the operator's TDD screen into voice communications to the other party and translates received voice communications from the called party into text by typing the information on the operator's TDD. The originating party then sees the information displayed on his TDD screen. A TDD user must normally call a predetermined operator assistance number in order to reach an operator having a TDD; telephone operators which provide general assistance may not have access to a TDD.

An increasing number of features and services are provided via the PSTN. Call routing functions and automatic response systems typically utilize DTMF tones such as generated from a Touch-Tone telephone pad in response to a voice message prompt or menu. Current automatic call processing systems require that the party be able to understand a voice prompted message and that the party be able to respond with appropriate choices utilizing DTMF signaling. Failure to provide an appropriate DTMF signaling reply within a predetermined time typically causes the call to be routed to the called party's operator for further handling. This permits nonhearing-impaired users without access to DTMF signaling to utilize the system. However, a hearing impaired person cannot take advantage of such an automatic recognition system because of the inability to understand the voice message prompt.

Modem communications over the PSTN is increasing with the widespread use of personal computers. Conventional modems which comply with established Bell and CCITT standards transmit and receive tones which are digital representations of alphanumeric characters in accordance with a defined ASCII data format. Communication mode problems do not exist for direct calls when the calling party and the called party each utilize compatible modem communications. PSTN operators are not normally equipped with modem communications equipment and hence, operator assistance will require a user to switch to voice communications rather than modem communications for such assistance. Although both TDD and modems utilize tone signaling, the formats and techniques differ and hence, are not compatible.

Them exists a need to provide more flexible telecommunication services which will accommodate different communication modes.

SUMMARY OF THE INVENTION

It is an object of the present invention to improve the handling and routing of calls within a telecommunications network so that different communication modes can be automatically processed.

In an embodiment of the present invention, a multimode service system has selected calls routed to it by a digital switch which require a call process action. Examples of selected calls include, but are not limited to, calls wherein operator assistance is requested by the originating party by dialing an operator assistance prefix (referred to as "zero plus" calls) and calls wherein special called party services are utilized to route the call according to predetermined factors such as the routing of "800" number calls in accordance with called party requirements. The multimode service system processes such calls by automatically determining the communication mode utilized by the calling party and communicating with the calling party utilizing the calling party's communication mode to obtain information from the calling party needed to further route the call or implement an action or feature requested by the user. The multimode service system transmits control information to the coupled digital switch corresponding to call routing or parameter selections to be implemented in response to selections communicated by the user. If the service system is unable to automatically process the user's call, the call can be automatically routed to an operator with appropriate communication mode capability for further processing.

DETAILED DESCRIPTION

Figure 1:
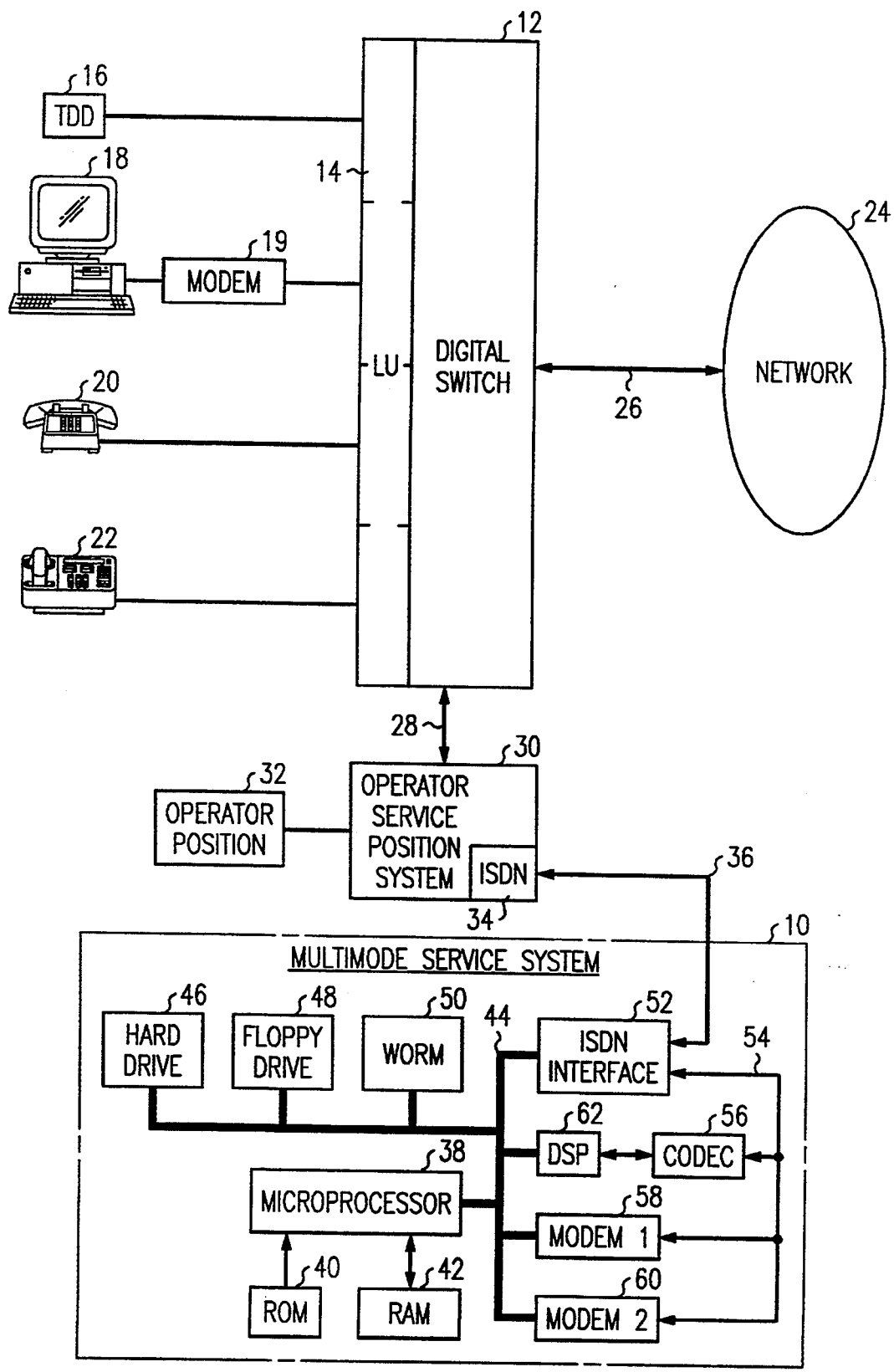
FIG. 1 is a block diagram of a telecommunications system incorporating an embodiment of the present invention.

FIG. 1 illustrates a telecommunications system which incorporates an embodiment of the present invention, multimode service system 10. A digital switch 12 such as an AT&T 5ESS ® switch includes conventional line units 14 which support a variety of customer premises equipment (CPE) including a TDD 16, a personal computer (PC) 18, an analog telephone 20, and an ISDN telephone 22. The PC 18 includes a conventional modem 19, that provides communications utilizing the ASCII data format. The digital switch provides communications between CPE 16-22 and other CPE equipment not coupled to digital switch 12 by routing such communications to telecommunications network 24 via trunk lines 26. A communication line 28 routes calls which require operator assistance to an operator service position system (OSPS) 30 such as an available module from AT&T which operates as part of a 5ESS switch. The OSPS 30 is coupled to a plurality of operator positions 32 which display call parameter information to the operator, allow the operator to provide keyboard entries to direct the call, and allow verbal communications via a two-way headset. The OSPS 32 may also include TDD equipment to enable communication with a calling party using that mode of communication. In the illustrative system, OSPS 30 includes an ISDN interface unit 34 which facilitates communication via line 36 with multimode service system 10.

A key purpose of multimode service system 10 is to provide call handling assistance by allowing calling parties to utilize different communication modes without requiring the intervention of an operator. The service system 10 includes a microprocessing unit 38 which is supported by program instructions stored in read-only memory (ROM) 40 and random access memory (RAM) 42. A conventional digital data bus 44 couples MPU 38 with various peripheral devices including hard drive 46, floppy drive 48, and write once read many optical storage system (WORM) 50. Devices 46-50 provide various capacities for storing programs and data utilized by the system. Multimode service system 10 may comprise a personal computer configured with peripherals as shown.

An ISDN interface board 52 provides communications utilizing ISDN digital communications protocol via line 36 with OSPS system 30. Information communicated between OSPS 30 and system 10 include communications originated by the calling party and call related information which would have been available at an operator position 32 such as the number of the called party associated with a requested operator assistance collect call ("zero plus" calls). The ISDN interface 52 translates between ISDN digital formatted information carried by line 36 and analog signals carried by analog bus 54. Communications from the user carried by line 36 are translated and output as analog signals on bus 54 which are received by coder/decoder (CODEC) 56 and modems 58 and 60. The CODEC 56 functions as an analog-to-digital translator between analog bus 54 and the digital signal processor (DSP) 62. The ISDN interface 52, DSP 62, and modems 58 and 60 are each coupled to digital bus 44 and operated under the control of MPU 38.

In the illustrative embodiment, a key function of DSP 62 is to process digital samples of received analog signals on bus 54 to determine the user's mode of communication, i.e., which, if any, of a predetermined set of known standard communication modes is being used. In the illustrative example, the DSP 62 is capable of detecting the following types of signaling: analog voice based on a speech recognition algorithm, Baudot coding utilized by TDD's, DTMF signals generated by telephones, and modem signaling using Bell or CCITT standards. Separate algorithms suited for detecting these signals are stored in hard drive 46 and loaded into memory integral to the DSP so that each algorithm operates on each sample of user communication presented to DSP 62. After a number of such samples have been processed, a decision is made based upon the similarities and differences between the data recovered by each algorithm and the type of data that would have resulted if an algorithm had decoded signals encoded by the corresponding (same) communication mode. Thus, a determination is made which, if any, of the communication modes are present. Once a decision as to mode of communication has been made, the DSP is utilized, except for modem signaling, to decode incoming information, and generate and transmit messages such as a selection menu to the calling party utilizing the incoming mode of communication. Different messages corresponding to the different access code or telephone number called by the user are stored in WORM 50, loaded into RAM 42, and communicated to the user following a determination of the communication mode. If modem communication is utilized, modems 58 and 60 are utilized in the present invention, following mode detection by DSP 62, to transmit stored messages to the calling party under the control of MPU 38 and receive user replies. The communication mode determination is preferably made prior to establishing the communication path to the called party, i.e., prior to linking the called party's CPE to the calling party. Thus, multimode service system 10 can be considered as "preprocessing" the call.

Figure 2:
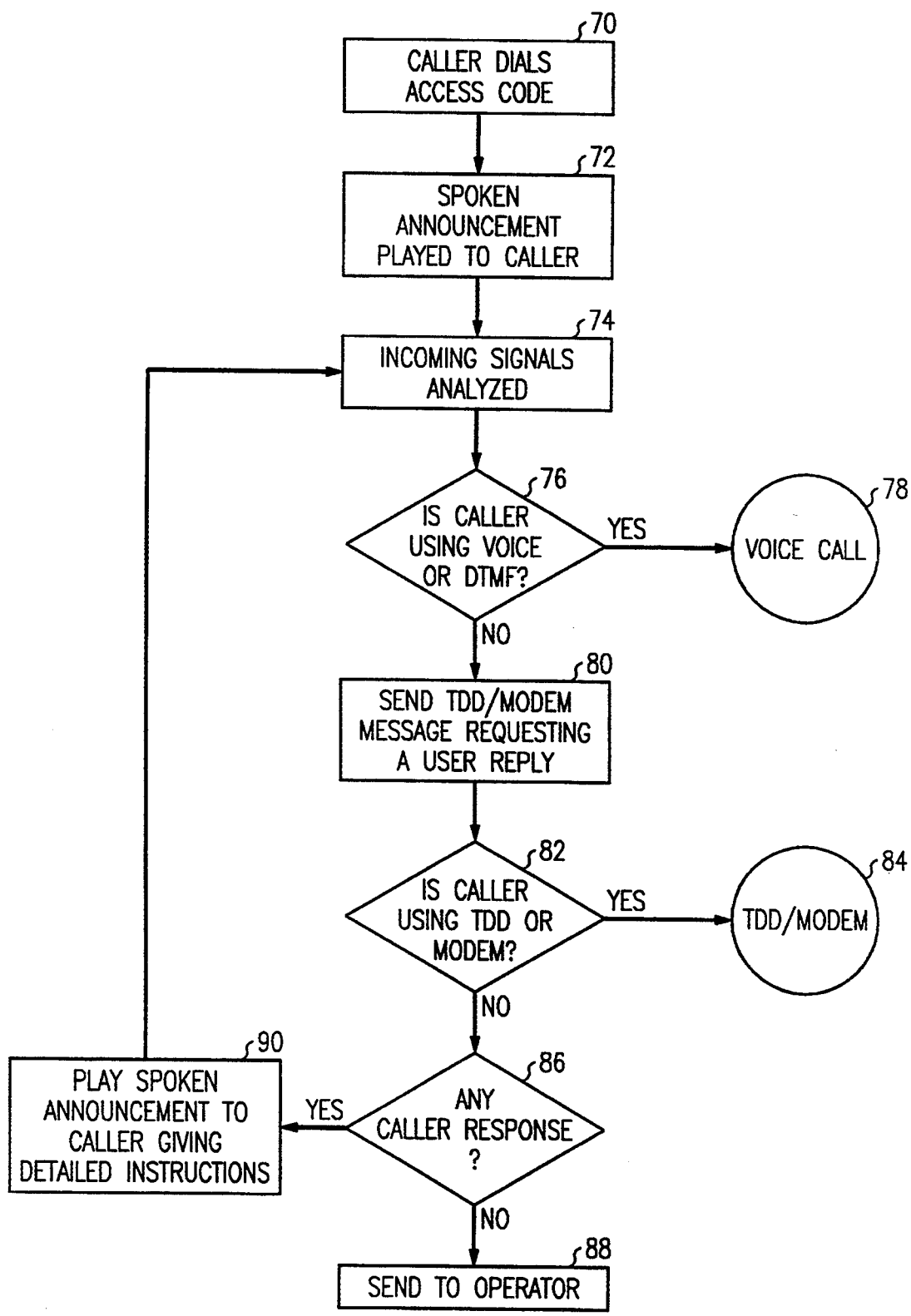
FIG. 2 is a flow diagram illustrating steps utilized to automatically determine the mode of communication utilized by a calling party.

FIG. 2 is an exemplary flow diagram utilized in conjunction with the embodiment of FIG. 1 which illustrates steps in making a communication mode determination. These steps begin with the caller dialing a telephone number or an access code as indicated in step 70. An access code which will route the call to multimode service system 10 may comprise a predetermined telephone number made known to users in order to access the system, or may consist of an assigned access code such as "zero plus" calls. For the latter type of access codes, the embodiment according to the present invention provides automatic user services in place of an operator or in conjunction with an operator. In step 72 a stored verbal announcement is sent to the caller. The announcement may be stored in digital form in WORM 50, copied into RAM 42, and translated into analog format on analog line 54 by DSP 62 and CODEC 56. The analog signal would then be transmitted by the ISDN interface 52 via the OSPS 30 and digital switch 12 to the calling party. Alternatively, the spoken announcement may be stored in OSPS 30 or digital switch 12 and replayed to the calling party. The purpose of the announcement is to elicit from the calling party a voice response or DTMF response, depending upon the features and functions supported for the particular access code.

In step 74 the incoming signals, if any, from the calling party are analyzed in accord with the different algorithms that correspond to the different communication mode. In step 76 a determination is made if the caller is using voice or DTMF signaling. A YES determination causes the call to be further processed by a voice call subroutine 78. Reaching step 78 is indicative that the calling party is not a hearing impaired TDD user nor a modem user since neither user would have normally understood the spoken message of step 72. A NO determination by step 76 causes a TDD and modem message to be serially sent in step 80 requesting a reply from the user. The purpose of the message is to elicit a reply from the user in the user's communication mode so that confirmation can be made if the user is using a TDD or modem mode. In decision step 82 a determination is made if the user is using TDD or modem communication modes. A YES determination results in the call being further processed by TDD/modem routine 84; an example of such further processing is described with regard to FIGS. 3 and 4. Although a determination is made as to whether the communication mode is TDD or modem, a positive determination of either mode can generally be treated by the same handling routine since both involve character-by-character transmission. Upon a NO determination by step 82, a determination is made in step 86 if the caller is still on the line. If NO, the caller has hung up and the call is ended at step 88. Upon a YES determination by step 86, a spoken announcement is played to the caller giving detailed instructions in step 90. This gives the user another opportunity to enter a response so that the communication mode can be recognized by initiating the previous process at step 74. Although the exemplary flow diagram shows a series of prompts and mode detection steps, it will be apparent that parallel processing of a user communication can be utilized as soon as received where separate processes that correspond to different communication modes act on the communication to make a mode determination.

Figure 3:
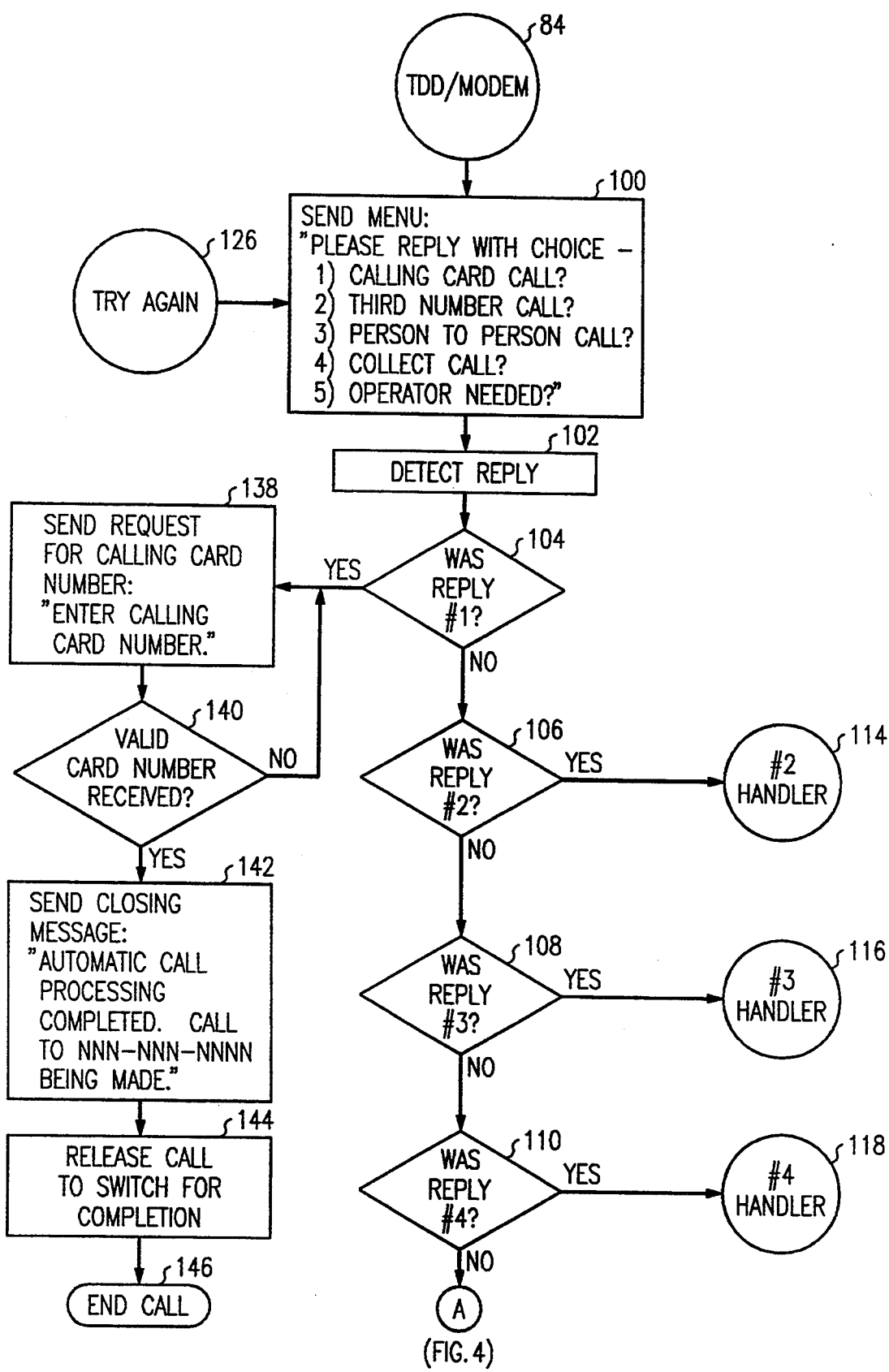
FIGS. 3 and 4 are flow diagrams which illustrate exemplary steps utilized in cooperation with FIG. 2 to interact with the calling party to determine parameter selections desired by the calling party.
Figure 4:
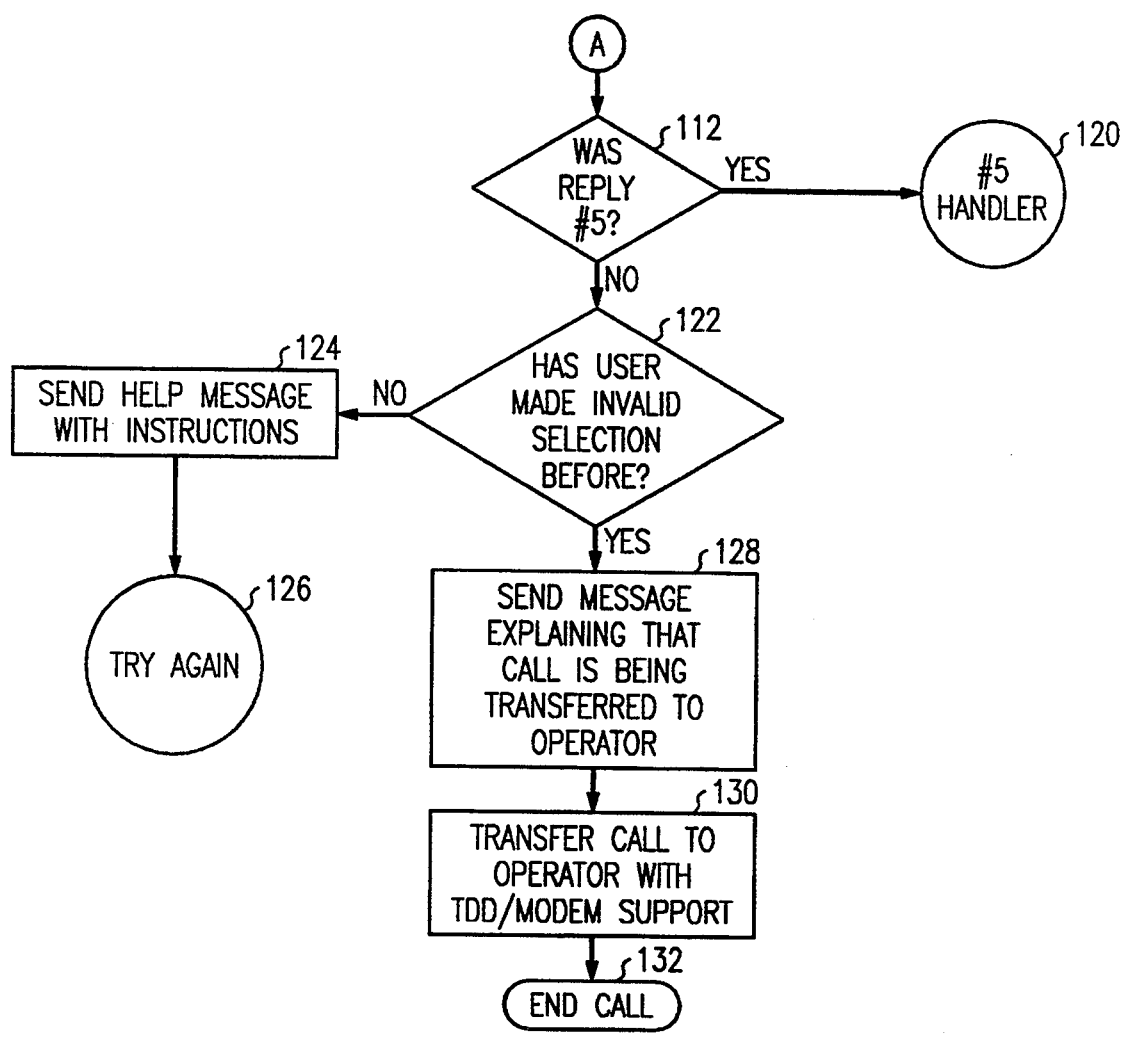

FIGS. 3 and 4 are exemplary flow diagrams illustrating a TDD/modem routine 84 referenced in FIG. 2. Although the exemplary flow diagram is directed to a particular example, it will be understood by those skilled in the art that various selections and choices may be handled in a similar manner. A first menu provided to the user following identification of the communication mode may consist of a general menu with each item leading to a series of more specific submenus. To best illustrate the exemplary embodiment of the present invention, a specific example is illustrated in FIGS. 3 and 4.

In step 100 the illustrated menu is transmitted to the user in order to obtain a selection by the user. It will be understood that although a reference has been made to TDD/modem signaling mode, only one of these modes (the TDD or modem mode) will be utilized to provide the same communication mode as used by the user. The two modes are treated together for purposes of this illustration since the same messages can be used and are transmitted as individual characters to be displayed on a user's screen or otherwise delivered to the user's device. Following the transmission of the menu, the user's reply is detected at step 102. If the user is utilizing a TDD mode, the detection in transmission will be accomplished by CODEC 56 and DSP 62; if a modem mode is utilized, communications to and from the user will be handled by one of modems 58 and 60.

In step 104 a decision is made as to whether the reply from the user was a selection of the first item in the previously transmitted menu, i.e., did the user choose to make a calling card call. The detection of the reply preferably consists of alternative capabilities including detecting numerals corresponding to the item selection as well as parsing characters received in order to correlate the received characters with key words or portions of words corresponding to choices. A NO determination by step 104 results in a series of determinations of which, if any, of the other menu choices were selected. Determination steps 106, 108, 110, and 112 determine if a reply corresponded to items 2, 3, 4, or 5, respectively. A YES determination by steps 106, 108, 110, or 112 results in a corresponding routing to an appropriate handler 114, 116, 118 or 120, for the respective choice by the user. The steps implemented by handlers 114-120 will vary depending upon the function selected and the particular system architecture and configuration. An exemplary handling corresponding to a YES determination by decision step 104 is provided. A NO determination by the last sequential determination step 112 results in a determination in step 122 as to whether the user has made an invalid selection before. Upon a NO determination, a message is sent to the user providing help instructions at step 124. Then, at TRY AGAIN step 126 the process returns to the beginning to permit the user to reinitiate the selection process at step 100. A YES determination by step 122 results in a message being sent to the user explaining that the call is being transferred to an operator by step 128. In step 130 the call is transferred to an operator and the automatic processing of the call by system 10 ends as indicated by step 132. It should be noted that a YES determination by step 122 indicates that the user had at least one previous attempt to make a valid selection before routing the user to an operator.

Upon a YES determination at step 104, indicating that the user selected the first choice (initiate a calling card call), a request is sent to the user to "enter the calling card number." In step 140 a determination is made if a valid card number has been received from the user in response to the prior request. Preferably, system 10 performs a format validation, such as checking for the correct number of digits, before sending the calling card number to a conventional data base external to system 10 for final validation. Upon a determination of an invalid number or after a predetermined period of time without a proper or complete response, a NO determination is made by step 140 which results in returning to step 138 to provide the user another prompt to enter the card number. A YES determination by step 140 is followed by a closing message in step 142 telling the user that the automatic call processing has been completed and that the requested call is being placed to the displayed number. For a normal "zero plus" call, i.e., an operator assisted call, the user will have initially entered the number of the party to be called (0-NNN-NNNNNNN). In step 144 the call currently being handled by automatic processing is released for further handling by the associated digital switch, i.e., for completion of the requested calling card call to the called party. In step 146 the automatic call processing ends the call, i.e., the multimode service system 10 has terminated its action.

The preceding example assumed either a TDD or modem communication mode. In the case of a voice call, a known voice call routine 78 (not explained in detail herein) would send voice messages to the user. Replies requested from the user would either be by return voice as decoded by a speech recognition algorithm or DTMF signaling to select the desired menu item.

Figure 5:
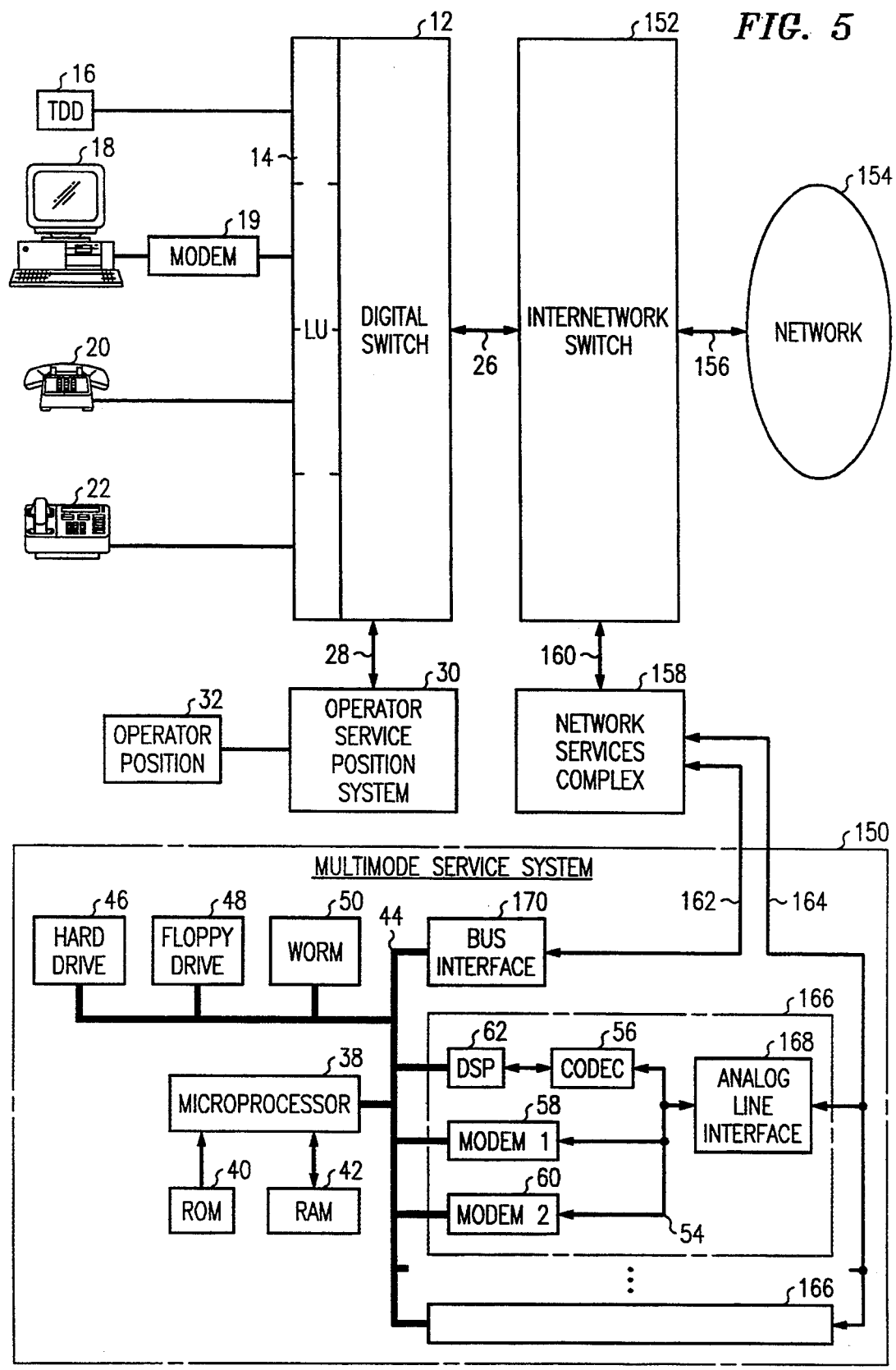
FIG. 5 is a block diagram illustrating a telecommunications system which incorporates another embodiment of the present invention.

FIG. 5 illustrates a telecommunications system which incorporates an alternative embodiment 150 of a multimode service system in accordance with the present invention. Elements in FIG. 5 which are common with those of FIG. 1 have like reference numerals and functions, and hence, will not be described with regard to FIG. 5. An internetwork switch 152 such as an AT&T 4ESS ™ switch is coupled to digital switch 12 via trunk 26, to network 154 via trunk 156 and to network services complex (NSC) 158 via trunk 160. A network services complex 158 such as available from AT&T, provides call processing functions in connection with switch 152 by sending voice messages to users to prompt the user for a selection from a series of announced choices and provides detection of DTMF signaling from the user as responses to the voice messages. Such services may be typically associated with advanced "800" services which permit companies with large inbound traffic to presort and route incoming calls in accordance with different subject areas for more efficient handling of calls. The NSC 158 is connected to multimode service system 150 via a digital communication bus 162. X plurality of analog channel modules 166 are connected, respectively, to analog channels 164 which are connected to NSC 158. The analog channels 164 carry user communications to modules 166 and provide a communication channel enabling modules 166 to transmit messages to users.

The multimode service system 150 includes a module 166 which supports two analog channels 164. The module 166 includes elements previously explained with regard to FIG. 1 and includes an analog line interface 168 to provide an interface between the analog signals on channels 164 and the analog bus 54 connected to CODEC 56 and modems 58 and 60. The analog line interface 168 provides appropriate buffering between the two analog buses. The elements 56–62 in module 166 function as previously described with regard to FIG. 1 except that the DSP 62 need not implement DTMF tone detection algorithms since this function is already provided in network service complex 158. A bus interface 170 interfaces the internal digital bus 44 with the digital channel 162 and may comprise a conventionally known interface such as IEEE 488 control bus.

The system shown in FIG. 5 is ideally suited, but not limited to, routing "800" number calls placed to large volume receiving parties. The multimode service system 150 provides improved flexibility with regard to existing 800 number service by allowing different communication modes to be automatically handled and routed without requiring manual intervention by an operator. Support for multiple modes of communication provides a more user friendly and efficient call routing mechanism by permitting automatic call routing of most communication modes. Although the multimode service system 150 provides TDD, modem, and speech recognition capabilities, it will be appreciated that other communication modes can be supported. An example of the utilization of system 150 follows.

Figure 6:
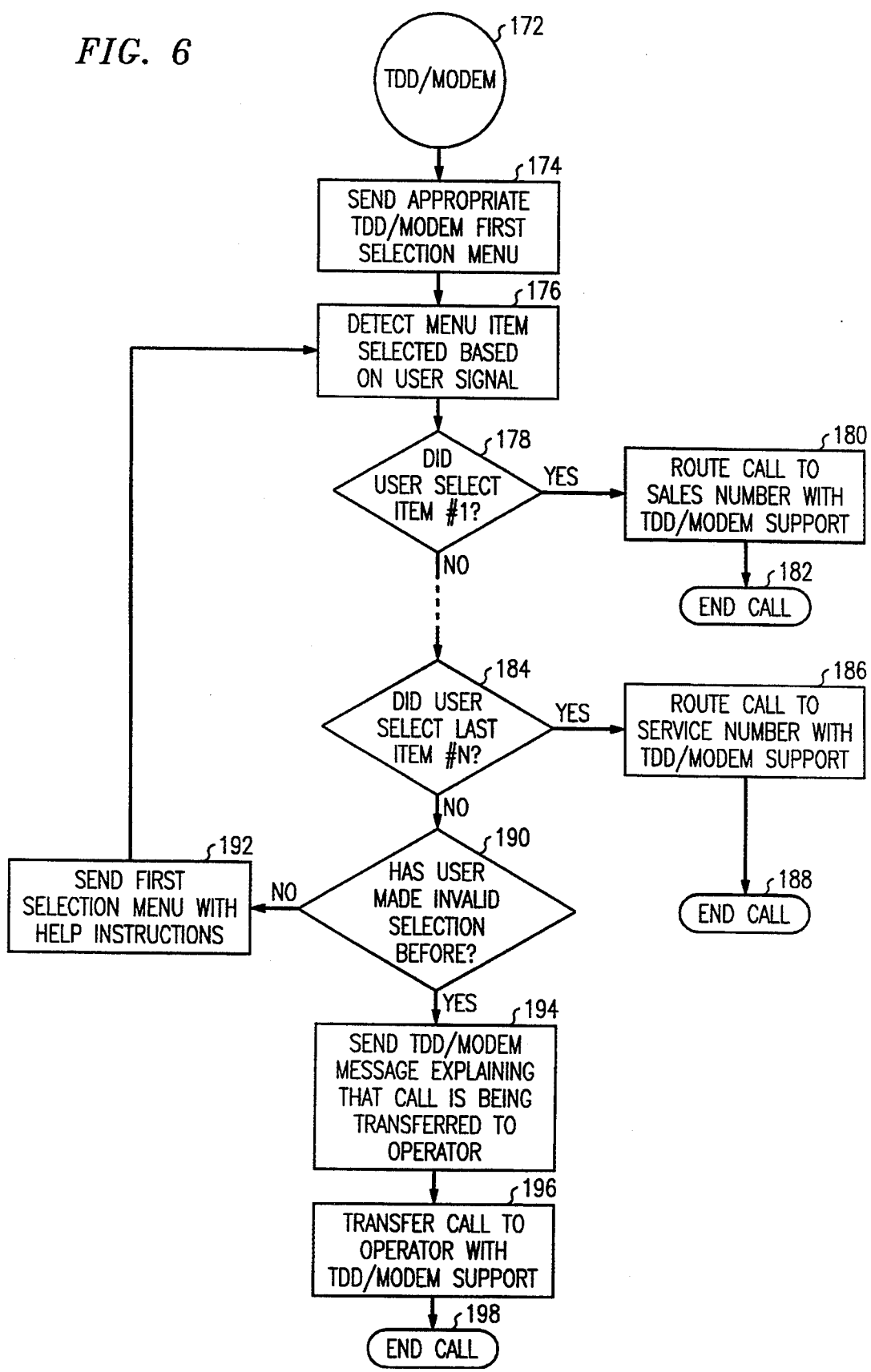
FIG. 6 is a flow diagram which illustrates exemplary steps utilized in conjunction with the embodiment of FIG. 5 to provide call routing desired by the called party in response to a calling party's selection.

FIG. 6 illustrates a flow diagram of the handling of a TDD or modem communication mode call by multimode service system 150. In the illustrative example it is assumed that a previous mode determination has already been made, such as in accordance with the steps of FIG. 2. Thus, entering the program at TDD/modem beginning step 172, an appropriate selection menu is sent to the user utilizing the user's communication mode, either TDD or modem, depending upon the incoming communication mode. In the illustrative example, the menu may consist of:

---
Select one of the following:
1. Sales
. . .
N. Service
---

In this example, the user is given a choice of having his call routed to various functions associated with the called number such as in accord with the desired handling of a call by a company with a high call volume "800" number.

In step 176 the menu item selected by the user is made based upon the user's reply. In step 178 a determination is made if the user selected item 1, i.e., the sales category in the menu sent by step 174. If YES, the call is routed to a predetermined sales number having appropriate TDD or modem support in step 180. Following the appropriate routing of the call, the automatic call processing ends at END CALL 182 wherein the call is established with called party CPE by the telecommunications system. A NO determination by step 178 results in a corresponding series of determination steps for other user choices with corresponding routing of calls (not shown) which are similar to steps 178, 180, and 182. In the last determination step 184 in the series, a determination is made if the user selected the last menu item, i.e., item number N which in the illustrative example corresponds to Service. Upon a YES determination the call is routed to a predetermined Service number with appropriate TDD or modem support in step 186. Automatic call processing is ended by END CALL 188. Upon a NO determination by step 184, a determination is made in step 190 if the user has made an invalid selection before. If NO, the user is sent a first selection menu with additional help instructions as indicated in step 192. The user is then returned to step 176 and proceeds as previously described. A YES determination by step 190 which indicates that the user had previously made an invalid selection, results in the user being sent an appropriate message explaining that the call is being transferred to an operator for manual processing as indicated by step 194 in step 196 the call is transferred to the operator via information sent to network services complex 158 which in turn causes switch 152 to route the call to the operator. The automatic call processing ends at END CALL 198 following call transfer step 196.

In the immediately preceding example, a hearing impaired user utilizing a TDD or a user utilizing a PC to control a modem was routed based on TDD or modem communications to an appropriate call destination as determined by the called party in accordance with selections made by the user. Such routing permits more efficient call handling and provides users with the flexibility of utilizing a variety of communication modes without switching to a voice or DTMF communication mode.

The present invention also has cross-mode applications such as cross-mode communications between a TDD user and a voice user without operator assistance. In such a cross-mode application, the TDD's transmissions would be automatically recognized as TDD mode and interpreted as alphanumeric text. The resulting text would then be recognized as English words and numbers, and the corresponding words and numbers transmitted to the other party using synthesized speech. The communications in the other direction would utilize speech recognition to interpret the words spoken by the other party and translate the words into appropriate TDD characters which would be automatically transmitted to the TDD user. Similar applications exist between modem communications and voice users, and between modem users and TDD users.

Although embodiments of the present invention have been described and shown in the drawings, the scope of the invention is defined by the following claims.

I claim:

1. In a telecommunications system in which a user selects a communication mode having an associated modulation format of signals, the improvement comprising:

means for monitoring calls seeking operator assistance;

means for automatically determining the communication mode used for communications by the user for said calls based on the modulation format of signals received from the user, said determining means making said determination independent of communication path completion to another party's customer premises equipment;

means for sending at least one message to said user using the same modulation format of signals as said modulation format of signals received from the user.

2. The system according to claim 1 further comprising means for communicating with a telecommunication device for the deaf (TDD) used by said user to generate said communication mode.

3. The system according to claim 1 further comprising means for communicating with a modem used by said user to generate said communication mode.

4. The system according to claim 1 wherein said determining means comprises a microprocessing means operating under the control of a software program for determining which, if any, of a predetermined set of communication modes is being received.

5. The system according to claim 4 wherein said predetermined set of communication modes comprises a TDD communication mode.

6. The system according to claim 4 wherein said predetermined set of communication modes comprises a modem communication mode.

7. The system according to claim 1 further comprising means for causing said telecommunication system to take call processing action based on a reply by the user to said one message.

8. The system according to claim 1 wherein said sending means sends a menu of choices selectable by the user, said system further comprising means for receiving a reply from said user utilizing said modulation format of signals which indicates the user's menu selection, and causing means for causing the telecommunications system to take further action corresponding to the menu selection.

9. The system according to claim 1 wherein said determining means makes said determination based on the modulation format of signals received from the user and not based on the information content of the signals received from the user.

10. A method for automatically processing calls in a telecommunications system in which a user can utilize different communication modes having corresponding signals of different modulation type comprising the steps of:

monitoring calls seeking operator assistance;

automatically determining a communication mode to be utilized for communications from said system to a user initiating one of said calls based on the modulation type of signal received from the user, said determination being made independent of communication path completion to another party's communication channel;

sending at least one message to the user using said determined communication mode.

11. The method according to claim 10 wherein said determining step comprises making said communication mode determination prior to a communication path completion to a called party.

12. The method according to claim 10 wherein the determined communication mode consists of a TDD communication mode.

13. The method according to claim 10 wherein said determined communication mode consists of a modem communication mode.

14. The method according to claim 10 wherein said sending step includes sending a menu of choices using said modulation type of signal used by said user, the method further comprising the steps of receiving a reply which indicates the user's menu selection, and causing the telecommunications system to take further call processing action corresponding to the user's menu selection.

15. The method according to claim 10 wherein said determining step is completed prior to said user being connected to customer premises equipment of another party.

16. The method according to claim 10 wherein said step of determining a communication mode to be utilized for communications to a user is based on the modulation type of signal received from the user and not based on the information content of said signals.

17. A telecommunication method for automatically preprocessing a call from a user over a channel in a telecommunications system comprising the steps of:

receiving a call seeking operator assistance from the user over said channel;

automatically determining a mode of communication used by said user based on a predetermined set of communication modes, said communication modes having signals of different modulation types, said determination being made independent of communication path completion to another party's customer premises equipment;

sending to the user over said channel a menu of choices using said determined mode of communications;

receiving a reply from the user over said channel indicating a choice selected from said menu;

transmitting a signal to the telecommunications system which identifies a call process action to be taken corresponding to said selected choice.

18. The method according to claim 17 wherein said mode of communication utilized by the user is a TDD communication mode.

19. The method according to claim 17 wherein the mode of communication utilized by said user is a modem communication mode.

20. The method according to claim 17 wherein said step of determining mode of communication used by the user is based on the modulation type of signals corresponding to the modulation mode of said set and is not based on the information content of said signals.

* * * * *